United States Patent [19]

Sullivan, Jr.

[11] Patent Number: 4,575,637

[45] Date of Patent: Mar. 11, 1986

[54] PART POSITIONING SYSTEM EMPLOYING A MASK AND PHOTODETECTOR ARRAY

[75] Inventor: William F. Sullivan, Jr., Stoughton, Mass.

[73] Assignee: Polaroid Corporation, Cambridge, Mass.

[21] Appl. No.: 518,053

[22] Filed: Jul. 28, 1983

[51] Int. Cl.⁴ .............................................. G01B 11/00
[52] U.S. Cl. ................................ 250/548; 250/237 R; 356/375; 356/394
[58] Field of Search ................... 250/548, 561, 237 R; 356/372, 375, 392, 394, 400; 318/640

[56] References Cited

U.S. PATENT DOCUMENTS

| | | |
|---|---|---|
| 3,299,273 | 1/1967 | Sturdevant . |
| 3,544,801 | 12/1970 | Dyck ............................. 250/237 R |
| 3,670,153 | 6/1972 | Rempert et al. .................... 250/548 |
| 3,723,013 | 3/1973 | Stirland et al. .................... 356/400 |
| 4,171,161 | 10/1979 | Jung ................................ 356/372 |
| 4,203,064 | 5/1980 | Suzuki et al. ..................... 250/561 |
| 4,217,053 | 8/1980 | Lavanchy et al. ................. 356/372 |
| 4,286,201 | 8/1981 | Roecks et al. ..................... 250/561 |
| 4,333,044 | 6/1982 | Blitchington ..................... 250/548 |

Primary Examiner—Edward P. Westin
Attorney, Agent, or Firm—John J. Kelleher

[57] ABSTRACT

A simplified object or piece-part positioning system for use with automated product assembly equipment for positioning piece-parts in a predetermined orientation for product assembly purposes. The system includes a support surface coupled to a drive source that is capable of moving the support surface in any direction along a given plane and/or about an axis perpendicular to the given plane in response to drive source positioning signals. The system also includes a part-position sensing module comprising a generally planar array of photosensitive elements electrically divided into a plurality of groups and positioned to sense light from a light source that backlights the piece-part to be positioned located on the movable table, for the purpose of determining any deviation of the photosensitive array sensed shadow of the piece-part from a slightly enlarged piece-part image in order to generate electrical signals representative of such deviation and subsequently employ these signals to cause the drive source to position or overlay the piece-part shadow and indirectly the piece-part within the outline of the enlarged piece-part image in response to piece-part deviation signals generated by the photosensitive element array.

9 Claims, 12 Drawing Figures

PART POSITIONING SYSTEM EMPLOYING A MASK AND PHOTODETECTOR ARRAY

BACKGROUND OF THE INVENTION

The present invention relates to object positioning apparatus, in general, and to apparatus for automatically positioning a piece-part in a predetermined orientation for subsequent assembly into a product, in particular.

Automated product assembly machines, for example, have been employed in manufacturing industries for a great number of years. More recently, though, technologically more sophisticated devices have been employed with such machines for such purposes. These more recent devices are commonly referred to as industrial robots. Industrial robots are capable of repetitively performing various mechanical tasks with a high degree of speed and accuracy in response to a set of programmed instructions such as the task of moving a piece-part or workpiece from one position to another as part of a product assembly process.

In order to employ the typical industrial robot in certain portions of an automated assembly process, it is essential that the piece-part be fairly accurately positioned for the robot prior to its initially moving same in order to avoid subsequent piece-part to piece-part misalignment during product assembly resulting from an initial positioning error. While an industrial robot is quite capable of precisely maintaining or changing the orientation of a piece-part when moving the part from one location to another, it is also true that any deviation or error between the desired piece-part orientation where the robot assumes the piece-part to be located and oriented and the actual piece-part location and orientation prior to initial piece-part movement, will also be maintained by the robot throughout piece-part movement because of the robot's inability to detect initial piece-part position and/or orientation errors. Therefore, in order to insure that one piece-part is properly mated to another during product assembly with a minimum of piece-part to piece-part misalignment errors when an industrial robot is employed for such purposes, it is essential that a piece-part be placed as close as possible to a particular initial position and orientation before being moved by the robot. The closer the piece-part to be positioned is placed to said particular initial position and orientation, the smaller will be any piece-part to piece-part misalignment during subsequent product assembly.

Present techniques for positioning a piece-part prior to movement of same by an industrial robot employ the use of such components as a conventional X,Y,$\theta$ piece-part orienting turntable in conjunction with a piece-part image sensing TV camera and a digital computer in which the physical characteristics of a particular piece-part are stored for subsequent piece-part recognition and orientation purposes. While these techniques are effective for such purposes, computers and TV cameras are relatively expensive items and a computer requires the services of a relatively high-cost computer programmer in order to describe the physical characteristics of each individual piece-part in sufficiently detailed computer language so as to be unambiguously recognized by the piece-part positioning system. In addition, while computerized piece-part positioning systems are able to position piece parts at an acceptable rate of speed for many product assembly applications, their ability to position relatively complex shaped piece-parts at the same acceptable rate of speed or the ability to position less complex shaped piece-parts at high rates of speed is limited.

The primary object of the present invention therefore is to provide low-cost apparatus for rapidly placing randomly oriented, relatively complex shaped objects in a predetermined position and orientation.

Another object of the present invention is to provide means for substantially reducing the time required to describe the characteristics of an object in machine recognizable form for automated object positioning purposes.

A further object of the present invention is to provide means for describing machine recognizable object characteristics that readily allows substitution of the machine recognizable description of one type of object to be positioned for that of another.

Other objects, features and advantages of the present invention will be readily apparent from the following detailed description of the preferred embodiment thereof taken in conjunction with the accompanying drawings.

SUMMARY OF THE INVENTION

In accordance with the teachings of the present invention, a simplified object positioning system is disclosed that is capable of rapidly moving relatively complex objects to a desired orientation within a predetermined area or location. The system includes a movable support surface coupled to drive means capable of moving said surface in any direction along a given plane and/or about an axis perpendicular to said given plane in response to drive means positioning signals. The system also includes part-position sensing means comprising a generally planar set of photosensitive elements electrically divided into a plurality of groups and positioned to sense light from a light source that backlights an object to be positioned located on said movable surface for the purpose of determining any deviation of the shadow of said backlighted object falling on said photosensitive set from that of a slightly enlarged light attenuating image of said object forming a part of or positioned adjacent said photosensitive element set, and for generating an electrical signal indicative of such deviation in order to cause said drive means to position the shadow and indirectly the object within the outline or silhouette of said object image in response to object position deviation signals generated by said photosensitive element set.

DESCRIPTION OF THE PREFERRED EMBODIMENTS

Figure 1:
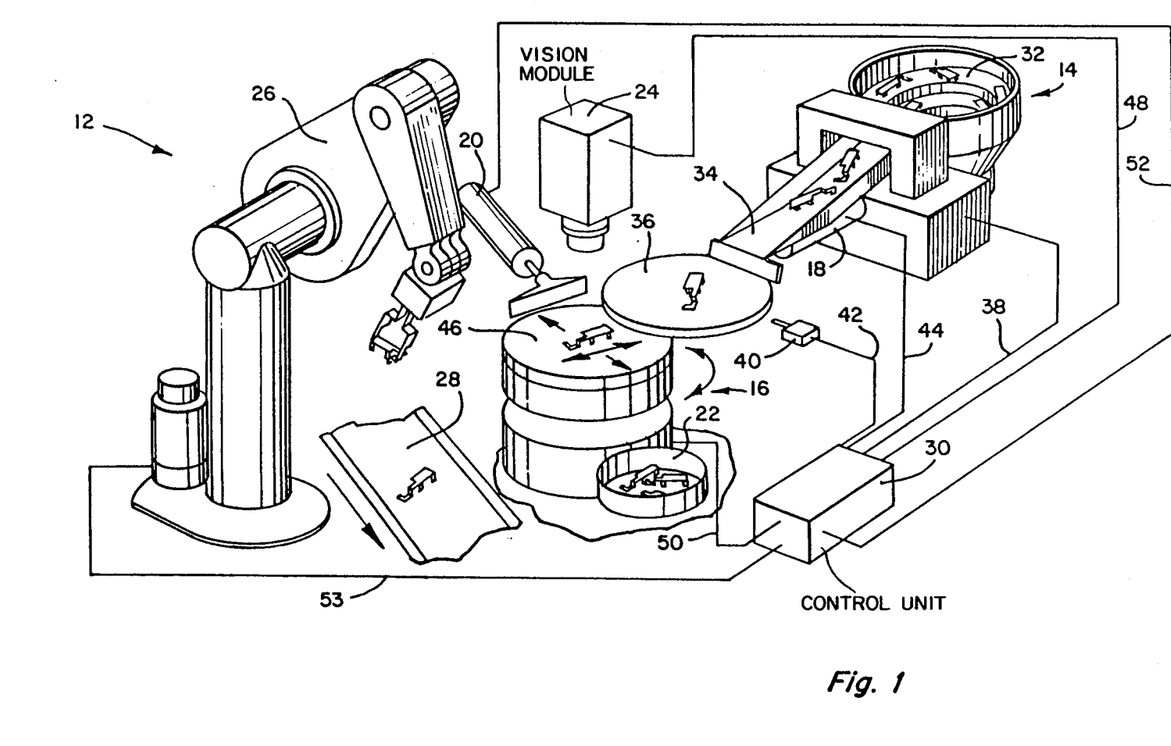
FIG. 1 is a system diagram of the object positioning apparatus of the present invention.

In FIG. 1 of the drawings, a system diagram of object positioning apparatus 12 incorporating a preferred embodiment of the present invention, is depicted. The major components associated with apparatus 12 are mechanical vibrator 14 for supplying and delivering the part to be positioned, X,Y,$\theta$ table 16 for moving the part in any direction within a particular plane and/or about an axis at right angles to said plane to a predetermined area or location, a pair of electrically activated actuators with one actuator 18 for pushing the part onto table 16 and another actuator 20 for pushing rejected parts off said table into receptacle 22, vision module 24 for sensing piece-part position relative to said predetermined area and generating signals representative of said relative position, industrial robot 26 that places properly positioned piece-parts on conveyor belt 28 and control unit 30 that controls the operation of these major apparatus 12 components.

Figure 2:
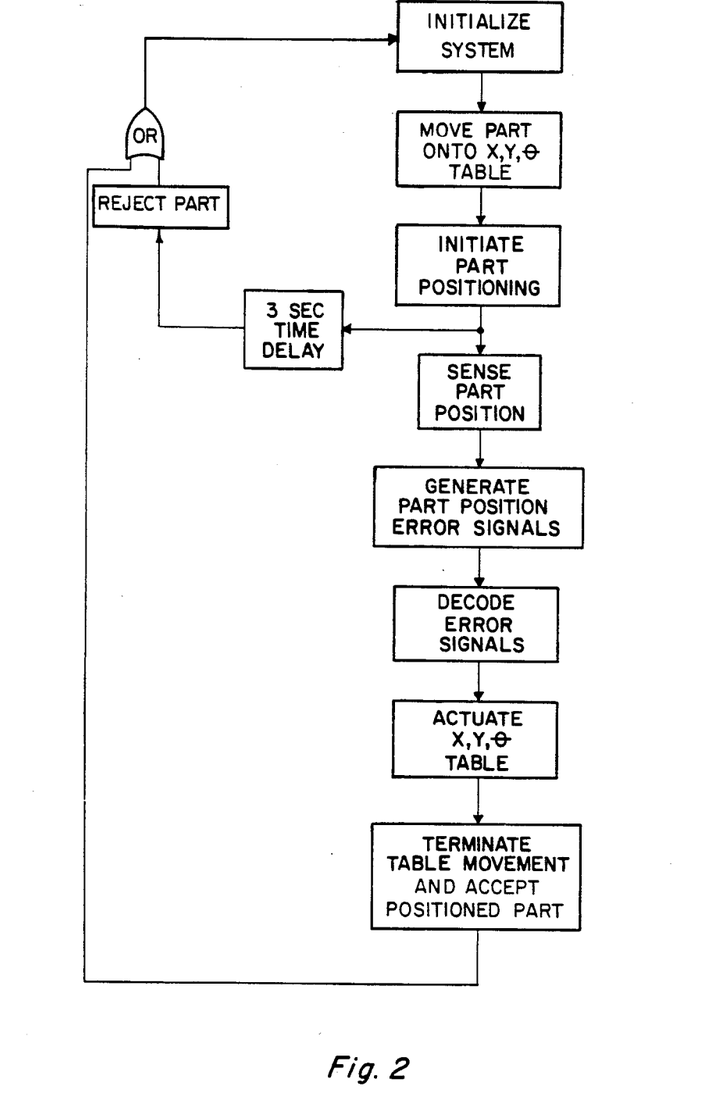
FIG. 2 is a signal flow block diagram of the control system portion of the object positioning system of the present invention.

Mechanical vibrator 14 moves piece-parts from its piece-part containing hopper 32 down chute 34 and onto receiving table 36 when activated by control unit 30 through path 38, part movement that is compatible with a predetermined sequence of events to be described below in detail. Piece-part presence on receiving table 36 is detected by conventional object sensing device 40 and a signal indicating such presence is routed to control unit 30 through path 42. The signal flow block diagram of FIG. 2 shows the overall sequence of operation of positioning apparatus 12. With reference to FIGS. 1 and 2, after the system has been initialized (initialization to be discussed below in detail) and upon receipt of an activation signal from control unit 30 through path 44, actuator 18 pushes a single piece-part that has been sensed by sensing device 40 onto backlighted surface 46 of table 16 for part positioning/orienting purposes. The retraction of actuator 18 to its initial or home position is the signal that initiates part positioning and starts a timer that will cause the piece-part to be rejected if not properly positioned within a maximum of 3 seconds. The initial or actual position of this piece-part on surface 46 is sensed by vision module 24 (described in detail below) and its position is compared with the desired position described and/or defined within said module 24. Module 24 subsequently generates piece-part position error signals that are routed to table 16 through control unit 30 and paths 48 and 50 for X,Y,$\theta$ table 16 positioning purposes. These error signals are decoded by decoder units within control unit 30. Upon receipt of these error signals, table 16 moves its surface 46 together with the piece-part located thereon along the plane of said surface 46 and/or about an axis that is perpendicular to surface 46 until the piece-part is positioned to the desired position as determined by vision module 24 and the position error signals are reduced to zero, which results in the termination of said surface 46 movement and the piece-part located thereon. If the piece-part is not positioned to the desired position within a predetermined time (normally 3 seconds), actuator 20 pushes the piece-part into receptacle 22 in response to a reject signal from control unit 30 through path 52. If the piece-part is positioned to the desired position within the alloted span of time, the piece-part is picked up from what is now a fairly well defined position by industrial robot 26 in response to a piece-part position signal from vision module 24 to control unit 30 through path 48 and preprogrammed industrial robot positioning signals from control unit 30 to robot 26 through path 53 and placed on conveyor belt 28 in a similarly well-defined position by said robot 26.

Several of the components of positioning apparatus 12 such as mechanical vibrator 14, actuators 18 and 20 and industrial robot 26 are fairly conventional devices while others such as vision module 24, control unit 30 and portions of X,Y,$\theta$ table 16 are not. It is primarily, though not exclusively, the design and interaction of the latter threecomponents that embodies the present inventive concept, and these components and their relationship to one another will now be described in detail.

Figure 3:
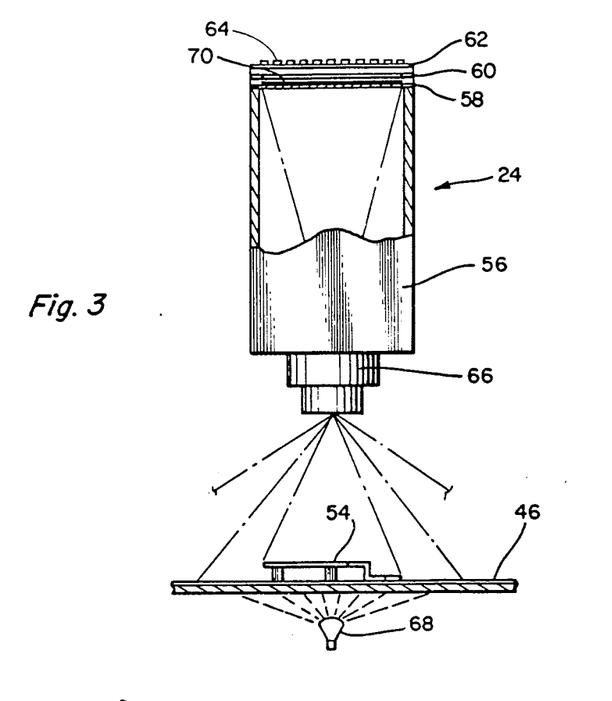
FIG. 3 is an enlarged elevational view, partly in section, of the object sensing vision module in FIG. 1 and a complex piece-part whose position is being sensed by said module.
Figure 4A:
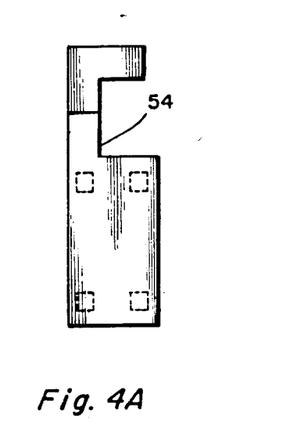
FIG. 4A is an enlarged top view of the complex shaped piece-part shown in drawing FIG. 3.
Figure 4B:
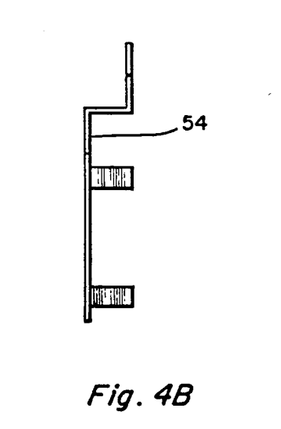
FIG. 4B is a side elevational view of the complex piece-part shown in drawing FIG. 4A.

Vision module 24, as noted above, senses the position of an object or a complex shaped product piece-part such as part 54 in drawing FIG. 3, relative to a predetermined area or position whose contours are fairly well defined within said module 24 and generates an electrical signal(s) representative of said relative position. Enlarged top and side views of part 54 are shown in FIGS. 4A and 4B, respectively. Module 24 includes housing 56 which is mounted in a fixed position above surface 46 of part-moving table 16. One end of housing 56 has three adjacent part-position sensing layers enclosing one end thereof. Innermost layer 58 is a glass light-diffusing layer whose function is to uniformly distribute light falling on one side thereof. Middle layer 60 is a slightly enlarged transparency of the positive image or silhouette of the part to be positioned. Photosensitive or outermost layer 62 includes a set or array of photosensitive elements 64 that, in conjunction with image layer 60 and a shadow of said piece-part 54, generates an electrical signal representative of piece-part 54 position relative to the piece-part image on said image layer 60 in a manner to be described in detail below. Housing 56 of module 24 also includes image-forming, light-focusing lens 66 at the end of housing 56 opposite from that of end layers 58, 60 and 62. Light source 68 within the upper or movable portion of table 16, (FIG. 1) lights the transluscent top surface 46 of said table 16 while at the same backlighting complex product piece-part 54 positioned thereon. In operation, image or shadow 70 of backlighted part 54 is formed adjacent light diffusing layer 58 by lens 66. The part position signals produced by the photosensitive elements of photosensitive array 64 are generated whenever image 70 of part 54 and the slightly enlarged silhouette of said part 54 in layer 60 are out of registration or alignment with one another. Following are the specific deails of how the part position signals are generated by such misalignment.

Figure 5:
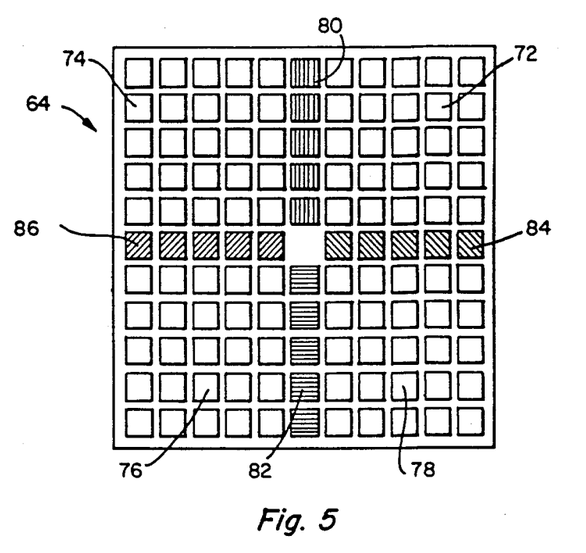
FIG. 5 is a planar array of the light sensing photosensitive elements incorporated in the vision module shown in drawing FIG. 3.

As shown in FIG. 5, which is an enlarged bottom view of photosensitive array 64 shown in drawing FIG. 3, said array 64 consists of 120, three-eighths inch square, uniformly distributed, photosensitive elements that are electrically subdivided into eight groups for the purpose of generating eight separate light-responsive signals to be employed for part positioning purposes. If necessary, a different number of groups having a different element size may be chosen to suit a particular part positioning task. These conventional photosensitive elements generate an electrical signal whenever they are illuminated by a suitable light source of sufficient intensity. Photosensitive array 64 is subdivided into 4 quadrant groups QI (72), QII (74), QIII (76) and QIV (78) with each of said quadrant groups containing a total of 25 photosensitive elements. In addition, array 64 is also subdivided into 4 linear or directional groups QN (80), QS (82), QE (84) and QW (86) with each of said directional groups containing a total of 5 photosensitive elements.

Figure 6:
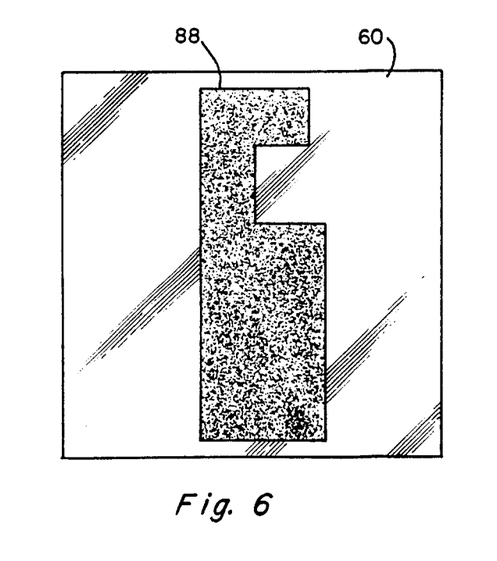
FIG. 6 is a transparent positive image of a slightly enlarged silhouette or mask of the complex piece-part as it is shown in drawing FIG. 4A.
Figure 7:
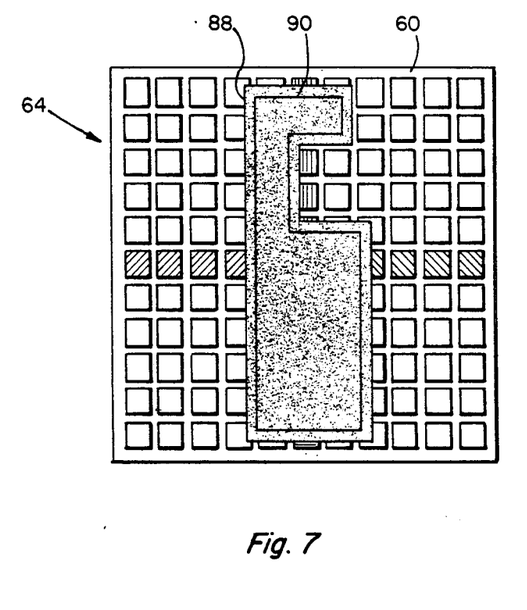
FIG. 7 shows the silhouette in the transparency of FIG. 6 overlaying the planar array of light sensitive elements as shown in drawing FIG. 5.

In addition of photosensitive array 64 shown in drawing FIG. 5, a bottom view of image or mask layer 60 that cooperates with said array 64 for object or part-positioning purposes is shown in drawing FIG. 6. Mask layer 60 consists of a transparency of slightly enlarged positive image 88 of part 54 (FIGS. 3, 4A and 4B) which is the part to be positioned by automatic piece-part positioning apparatus 12 (FIG. 1). This slightly enlarged image 88 is relatively opaque, is produced by standard or conventional photographic techniques for each different type of part to be positioned and is directly related to the predetermined area or location to which the piece-part is to be positioned. When photosensitive array 64 and mask layer 60 which includes enlarged positive image 88 are placed in the relative positions within vision module 24 shown in drawing FIG. 3, positive image 88 overlays portions of photosensitive array 64 in the manner shown in drawing FIG. 7. When the part to be positioned has been moved to the above-mentioned predetermined area or location by automatic positioning apparatus 12, the shadow or actual image of a backlighted piece-part, such as the shadow of part 54 in drawing FIG. 3 that is focussed on mask layer 60 by vision module lens 66, will fall completely within said positive piece-part image 88 which is the condition that will cause said apparatus 12 to terminate part 54 movement. The outline of the shadow or image of piece-part 54 is indicated by line 90 in drawing FIG. 7. Following is an explanation of how photosensitive array 64, enlarged object image 88, and the shadow of the object to be positioned interact for part positioning purposes.

Figures 8A, 8B:
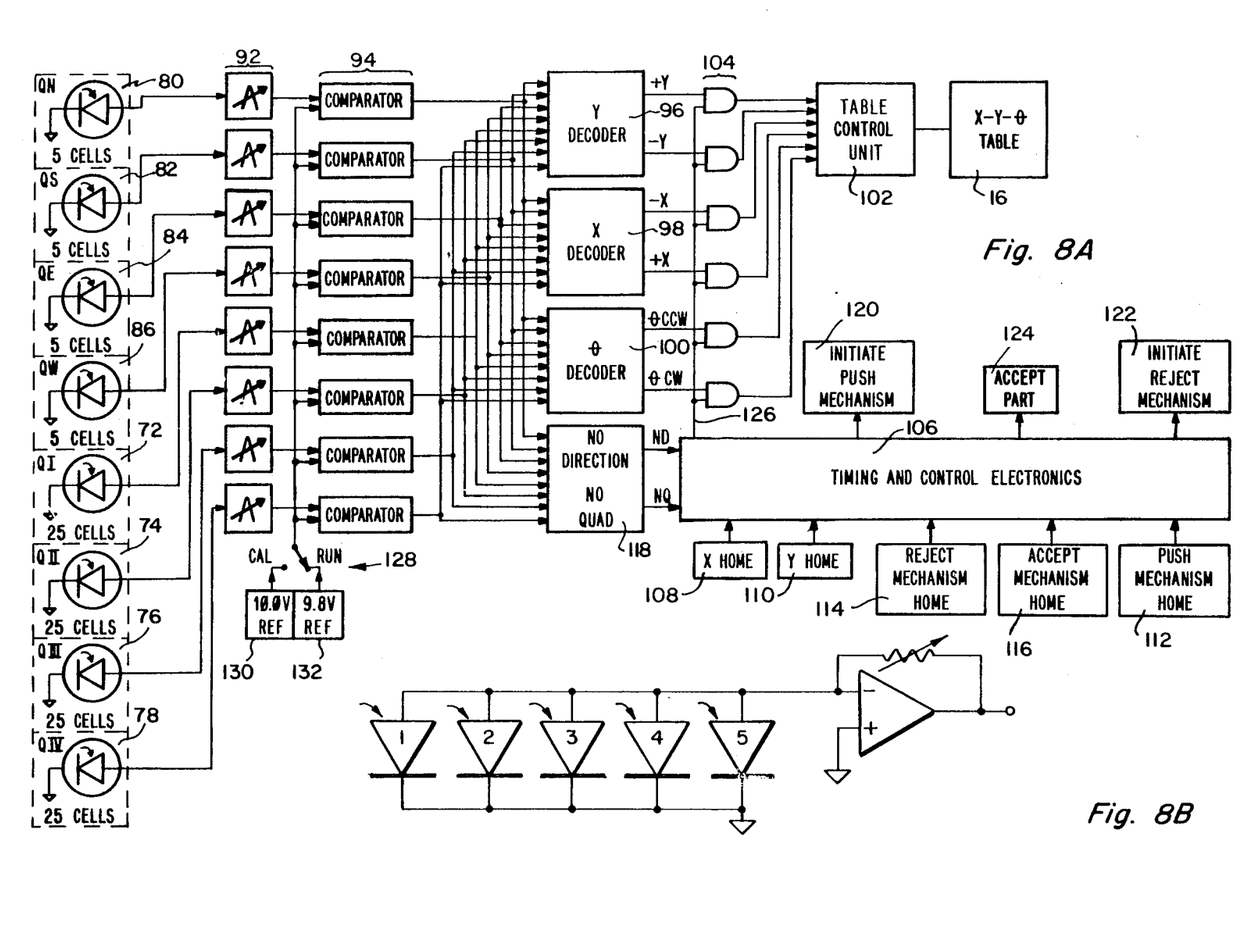
FIG. 8A is an electrical block diagram of the object positioning control system of the present invention.
FIG. 8B is an electrical schematic of all of the light sensing photosensitive elements included in one of the linear photosensitive groups shown in FIG. 8A.

FIG. 8A shows a signal flow block diagram of the control system portion of the object positioning system of the present invention that relies on the above-mentioned photosensitive array 64, mask layer 60 and object shadow interraction for object or part-positioning purposes. As schematically shown in FIG. 8A quadrants QI (72), QII (74), QIII (76) and QIV (78) of photosensitive array 64 (FIG. 5) each contain a total of 25 parallel-connected photosensitive elements. Similarly, FIG. 8A also shows linear or directional photosensitive element groups QN (80), QS (82), QE (84) and QW (86) of photosensitive array 64 with each of said directional groups containing a total of 5 parallel-connected photosensitive elements. A schematic diagram of one of the parallel-connected, 5 photosensitive element containing linear directional groups connected in electrical parallel is shown in drawing FIG. 8B. All of the photosensitive element groups shown in drawing FIG. 8A are the equivalent of photosensitive element groups with the corresponding reference numerals shown in drawing FIG. 5.

Each of the above-described photosensitive element groups has their output connected to a variable output amplifier that are collectively designated reference numeral 92 in drawing FIG. 8A. The output of each variable amplifier is, in turn, connected to its own comparator that are collectively designated reference numeral 94. Various combinations of comparator outputs indicative of part position on surface 46 of table 16 (FIG. 1) are applied to the inputs of X,Y,$\theta$ decoders 96, 98 and 100, respectively, where they are decoded in a manner to be described below for part positioning purposes. The outputs of decoders 96, 98 and 100 are routed to table control unit 102 and then to X,Y,$\theta$ table 16 through a set of enabling gates, collectively designated reference numeral 104, to control part-positioning by the rectilinear and/or rotational movement of surface 46 of table 16.

Figure 9:
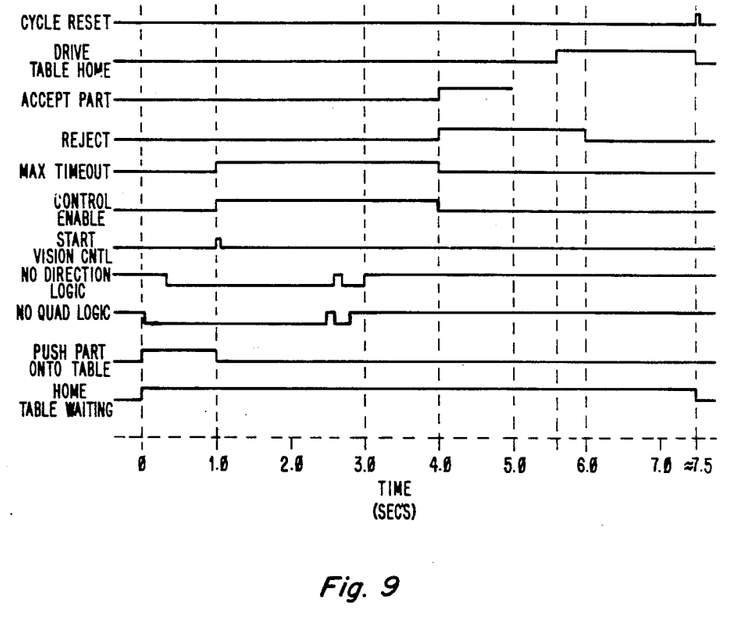
FIG. 9 is a time line of the sequence of operation of certain component parts of the object positioning apparatus of the present invention for a single object positioning cycle.

Referring now to FIGS. 1 and 8A, timing and control electronics 106 in the control system of FIG. 8A controls the part positioning system of the present invention in accordance with the typical time line shown in drawing FIG. 9. Signals representative of the condition of various components of the part-positioning system are routed to timing and control electronics 106 so that part-positioning in accordance with said FIG. 9 timeline can be provided. Part of the part-positioning control scheme requires that certain movable components return to an initial or predetermined home position for each part positioning cycle. X Home and Y Home signals 108 and 110, respectively, indicate the positioning of surface 46 of the upper or movable portion of table 16 to its initial position. Similarly, Push Mechanism Home signal 112 and the Reject Mechanism Home signal 114 indicate when part introducing actuator 18 and part rejecting actuator 20, respectively, have returned to their initial positions. Accept Mechanism Home signal 116 indicates the return of industrial robot 26 to its predetermined initial position and the input to timing the control electronics from decoder 118 indicates no output from any of the comparators 94 which signifies that the part to be positioned has been moved or positioned to the above-mentioned predetermined location or area. Initiate Push Mechanism signal 120 causes actuator 18 to push a part from receiving table 36 to surface 46 of table 16, Initiate Reject Mechanism 122 causes actuator 20 to push a rejected part into receptacle 22 and Accept Part signal 124 causes industrial robot 26 to move a properly positioned piece-part from surface 46 of table 16 to conveyor 28 in what would then be a relatively well defined orientation of the piece-part. Timing and control electronics 106 also transmits a table 16 control unit enabling signal to enabling gates 104, through path 126, once each part-positioning cycle.

The control system of FIG. 8A is adjusted and/or calibrated for each different type of object or piece-part for automatic piece-part orientation in the following manner. Once again referring to FIGS. 3 and 7, when mask 60 overlays photosensitive array 64 as in FIG. 7, and said array 64 and mask 60 are positioned in vision module 24 as shown in FIG. 3 and there are no parts or objects on surface 46 of table 16, some of the light rays from light source 68 of said table 16 that would otherwise be focused on the photosensitive element groups of array 64 by lens 66 are blocked or are prevented from falling on portions of said array 64 by enlarged positive image portion 88 of said mask 60. The shape and size of image portion 88 and therefore the extent of the blockage of light from array 64 is a function of the shape of the top or plan view of the piece part to be positioned which varies with each type of part and the selected orientation for each such part. The effect of the unequal illumination falling on the different photosensitive array 64 groups is neutralized for each different type of part by the amplifiers 92 connected to the output of said photosensitive array groups. When positive image mask 60 overlays array 64 as explained above, calibration switch 128 having calibrate and run positions for alternately connecting +10.0 v source 130 or +9.8 v source 132, respectively, to one input of each of the comparators 94, is placed in the calibrate position, thereby applying 10.0 v to one input of each of the comparators 94. The output of each of the amplifiers 92 is then adjusted to −10.0 v. In this condition, there will be no output from any of the comparators 94. Calibration switch 128 is then placed in its run position. In this state, a comparator in the group of comparators 94 will generate an output whenever the magnitude of its associated amplifier in group of amplifiers 92 becomes less negative than −9.8 v. A reduction in the voltage output of amplifier 92 occurs whenever a part to be positioned is moved onto surface 46 of table 16 as part of the piece-part positioning process such that the level of illumination falling on photosensitive array 64 is reduced below that falling on said array during the calibration process. Part-positioning signals resulting from a reduction in the illumination falling on photosensitive element groups 72, 74, 76, 78, 80, 82, 84 and/or 86 cause corresponding outputs from comparators 94 that are applied to decoders 96, 98, 100 and 118 where they are decoded in accordance with the following table for the control or movement of the upper portion of part-positioning table 16 and the part located thereon.

| Photosensitive Element Groups | Part Movement Direction(s) |
| --- | --- |
| 72 | −Y & −X |
| 74 | −Y & +X |
| 76 | +Y & +X |
| 78 | +Y & −X |
| 72 & 74 | −Y |
| 74 & 76 | +X |
| 76 & 78 | +Y |
| 72 & 78 | −X |
| 72 & 76 | +φ |
| 74 & 78 | −φ |
| 80 | −Y |
| 82 | +Y |
| 84 | −Y |
| 86 | +X |
| 84 & 86 | +φ |
| 80 & 82 | +φ |
| None | None |

Figure 10:
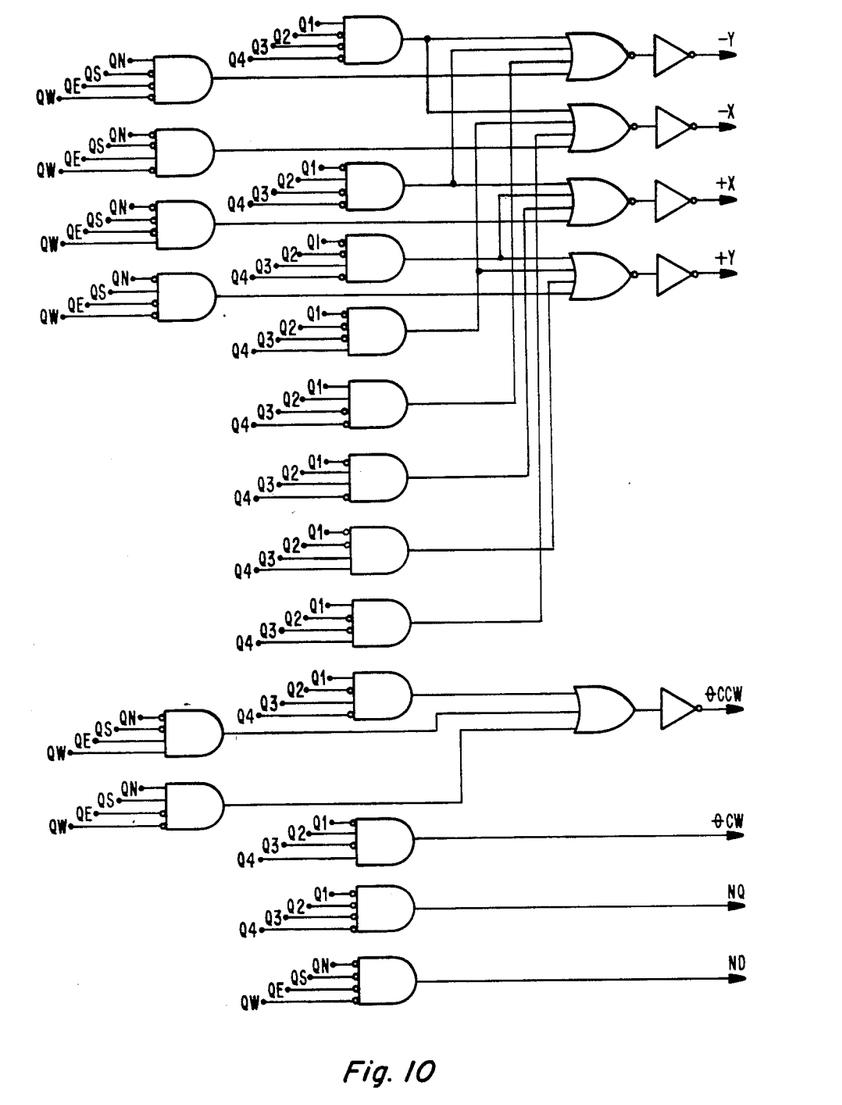
FIG. 10 is a logic diagram schematic of the signal decoder portions of the object positioning control system shown in drawing FIG. 8A.

Linear directions ±X and ±Y are directions of a standard rectangular coordinate system in a plane containing photosensitive array 64 and rotational directions ±θ are directions of a standard polar coordinate system that consist of rotational movement about an axis perpendicular to said plane of array 64. FIG. 10 is a logic diagram schematic that implements the above signal-decoding table for the control of part-positioning table 16.

OPERATION

Following is a more detailed explanation of the operation of object positioning apparatus 12 for the purpose of placing an object or piece-part in the relatively well-defined position and orientation. Before operating the part-positioning apparatus, it is assumed that a slightly enlarged positive image or mask layer 60 of the part to be positioned has been prepared and properly positioned within vision modulus 24 (FIG. 3). It is also assumed that the control system positioning apparatus 12 has been calibrated, that parts are present in hopper 32, that a part has been detected on receiving table 36 by object sensing device 40 and that all of the movable mechanisms are at their initial or home positions. With reference to FIGS. 1, 3, 5, 7 and 8A, the part-positioning sequence begins when timing and control electronics 106 enables gates 104 and generates Initiate Push Mechanism signal 120 which causes actuator 18 to move a piece-part onto backlighted surface 46 of table 16 and then return to its home position. When this occurs, light that had been focused on one or more of the various groups of photosensitive array 64 by lens 66 will be diminished or reduced by the shadow or actual image of the piece-part that was moved onto said backlighted table surface 46. This reduction in illumination will cause the magnitude of the voltage level output of one or more of the photosensitive groups to drop which, in turn, causes the input to one or more of the comparators 94 to become less negative than −9.8 V thereby causing one or more of the comparators 94 to generate a part-positioning output signal that is routed to decoders 96, 98, 100 and/or 118 where it is decoded in accordance with the above table and the corresponding logic diagram of FIG. 10. The decoded signal is routed through one or more of the enabling gates 104 to table control unit 102 for table 16 movement and therefore piece-part positioning purposes. When the piece-part has been moved by table 16 such that its shadow or actual image 90 falls completely within its enlarged image 88 (FIG. 7) of mask layer 60 within a maximum of 3 seconds, the amount of illumination falling on each of the photosensitive groups of array 60 will have returned to their initial levels or the levels occuring just prior to piece-part movement onto surface 46 of table 16 by actuator 18. When this occurs, the output of all of the amplifiers 92 will exceed or be more negative than −9.8 V which will cause the termination of part-positioning output signals from comprators 94. If part positioning does not occur within three seconds from the time that push mechanism or actuator 18 returns to its home position after pushing a part onto table 16, the part will be rejected or pushed into receptacle 22 by actuator 20 and then the entire part positioning system will be reinitialized. Decoder 118 informs timing and control electronics unit 106 when a piece-part has been positioned to a predetermined location (within enlarged positive image 88 of FIG. 7) and then timing and control electronics unit 106 generates Accept Part signal 124 causing industrial robot 26 to place the just-positioned piece-part on conveyor belt 28 in what would then be a fairly well defined piece-part orientation. When the various mechanisms of positioning apparatus 12 have been positioned to their initial or home positions and timing and control electronics 106 has generated a cycle reset pulse (FIG. 9), the above-described sequence is repeated for all of the piece-parts to be positioned remaining in hopper 32 of mechanical vibrator 14.

It will be apparent to those skilled in the art from the foregoing description of my invention that various improvements and modifications can be made in it without departing from its true scope. The embodiments described herein are merely illustrative and should not be viewed as the only embodiments that might encompass my invention.

What is claimed is:

1. Apparatus for placing an irregular shaped object within a predetermined area, comprising:
   a light source mounted in a fixed position for illuminating a portion of said object;
   a set of photosensitive elements spaced from said light source and electrically divided into a plurality of photosensitive groups for generating a plurality of object positioning electrical signals with each of said groups containing a plurality of photosensitive elements;
   a light attenuating, generally opaque mask interposed between said light source and said element set, said opaque mask being similar in shape and slightly larger than an image of said object with the shape of said opaque mask defining said predetermined area;
   means for supporting said object between said light source and said photosensitive element set; and
   means coupled to said object support means responsive to said electrical positioning signals for moving the shadow falling on said photosensitive element set produced by said illuminated interposed object to a rest position within said predetermined area.

2. Apparatus for positioning an irregular shaped object within a predetermined area, said apparatus comprising:
   a source of illumination;
   means for supporting and moving said object along a first plane within the illumination from said source so as to cast a silhouette of given size of said object on a second plane generally parallel to said first plane;
   photosensitive means for evaluating the illumination received in different portions of a peripheral area of said second plane exclusive of a select area similar in shape to and slightly larger than said given size of said silhouette, said photosensitive means including a set of photosensitive elements that are electrically divided into a plurality of photosensitive groups for generating a plurality of object positioning electrical signals with each of said groups containing a plurality of photosensitive elements; and
   control means for comparing the amount of received illumination in different portions of said peripheral area both before and after supporting said object to cast said silhouette and for controlling said supporting and moving means to advance said object across said first plane until the difference between the before and after illumination in each respective portion is minimized such that said silhouette will be located within said select area of said second plane and said object will be located at a corresponding area of said first plane.

3. The invention of claim 2 wherein said peripheral area includes a plurality of given photosensitive areas, each responsive to illumination received in nonconcurrent portions of said peripheral area, configured for defining an evaluation value for its given area, and said control means includes means for balancing the evaluation values of each area prior to supporting of said object to cast its said silhouette on said photosensitive means and for moving said object, once it has been supported to cast its silhouette, so as to return said evaluation values to the balanced condition.

4. The invention of claim 2 wherein said photosensitive means includes an array of photosensitive elements operative for evaluating illumination in both said peripheral and said select area, and means for selectively blocking illumination from said source to at least the outline of said select area on said array.

5. The invention of claim 4 wherein said means for blocking includes a mask having at least a substantially opaque area similar in shape to and slightly larger than the object image with said opaque area being located in a position to shadow said select area on said array.

6. The invention of claim 5 wherein said mask is a transparent sheet carrying said opaque area, and said supporting and moving means comprises a light transmitting support surface.

7. The invention of claim 4 wherein said array consists of a plurality of photosensitive elements having their output signals combined in select groups so as to define a segmented array operative to produce position signals from each group respectively in correspondence with the amount of illumination received in the portion of said array represented by each particular group.

8. The invention of claim 7 wherein said control means comprises means for comparing and balancing said position signals under said selective blocking of illumination but prior to supporting of said object in said illumination, and means for moving said object in said illumination once it has been supported therein to return said signals from each group to a balanced condition.

9. The method of positioning an irregular shaped object within a predetermined area comprising the steps of:
   defining a photosensitive array, said photosensitive array including a set of photosensitive elements that are electrically divided into a plurality of photosensitive groups for generating a plurality of object positioning electrical signals, with each of said groups containing a plurality of photosensitive elements;
   producing position signals responsive to the amount of illumination received in different portions of the array;
   directing illumination through a light transmitting support so as to cast a silhouette of given size of said object on said array when said object is located on said support;
   masking illumination transmitted through said support from being received on said array in a select area thereof similar in shape to and slightly larger than the silhouette to be cast on said array;
   determining the initial values of illumination received in different portions of said array enclosing said select area prior to mounting of said object on said support;
   mounting said object on said support so as to cast its silhouette;
   redetermining the values of illumination received in said different portions of said array; and
   moving said object on said support to a position wherein the redetermined values are substantially equal to the initial value at which point said silhouette is located within said select area and said object is located in a corresponding area on said support.

* * * * *